United States Patent
Giglio

(10) Patent No.: US 6,663,271 B1
(45) Date of Patent: Dec. 16, 2003

(54) BRAKE LIGHT FOR MOTOR VEHICLES

(76) Inventor: Gino Giglio, 9790 Honeysuckle Ave., Palm Beach Gardens, FL (US) 33410

( * ) Notice: Subject to any disclaimer, the term of this patent is extended or adjusted under 35 U.S.C. 154(b) by 0 days.

(21) Appl. No.: 10/210,226

(22) Filed: Aug. 1, 2002

(51) Int. Cl.[7] .................................................. B60Q 1/26
(52) U.S. Cl. ........................ 362/541; 362/554; 362/293; 362/296; 362/511; 362/493
(58) Field of Search ............................... 362/541, 554, 362/293, 296, 335, 503, 504, 543, 542, 511, 493; 340/425.5, 453, 459, 468, 479, 472

(56) References Cited

U.S. PATENT DOCUMENTS

| | | |
|---|---|---|
| 1,533,959 A | 9/1925 | Pirkey |
| 1,806,276 A | 5/1931 | Bailey |
| 2,190,123 A | 2/1940 | Pace |
| 2,650,355 A * | 8/1953 | Pieczonka .................. 362/540 |
| 3,364,384 A | 1/1968 | Dankert |
| 3,665,392 A | 5/1972 | Annas |
| 4,464,649 A | 8/1984 | Her |
| 4,682,146 A | 7/1987 | Friedman, III |
| 4,837,554 A | 6/1989 | Gianforcaro |
| 4,940,962 A | 7/1990 | Sarokin |
| D314,244 S | 1/1991 | Matsumura et al. |
| 5,025,245 A | 6/1991 | Barke |
| 5,219,218 A * | 6/1993 | Iino ............................ 362/490 |
| 5,219,602 A | 6/1993 | Saleeb et al. |
| 5,255,165 A | 10/1993 | Cail |
| 5,272,602 A | 12/1993 | Sasajima et al. |
| 5,373,426 A | 12/1994 | O'Sullivan |
| 5,379,198 A | 1/1995 | Zhang |
| 5,400,225 A * | 3/1995 | Currie ......................... 362/554 |
| 5,680,101 A | 10/1997 | Pitcher |
| 5,798,691 A | 8/1998 | Tim Kao |
| 6,048,085 A * | 4/2000 | Turner ......................... 362/504 |
| 6,172,598 B1 * | 1/2001 | Lee et al. ................. 340/425.5 |

* cited by examiner

*Primary Examiner*—Stephen Husar
*Assistant Examiner*—Sharon Payne

(57) ABSTRACT

A brake light is provided in a for a motor vehicle which is adapted for installation into each of left and right roof pillars of the vehicle. The brake light is mounted in a recess in proximate the top of each roof pillars and comprises a housing including a reflective shell and a translucent lens member matingly attached thereto to form a sealed enclosure; a socket disposed in said housing and secured to said reflective shell having a light bulb removably inserted therein; and a means to electrically couple the socket to the brake light electrical system whereby said light bulb is illuminated continuously when the vehicle brakes are applied. The translucent lens member can configured to be flushly aligned with the top surface of the roof pillar. In an alternative embodiment, the brake light can be illuminated by fiber optic cables.

19 Claims, 5 Drawing Sheets

BRAKE LIGHT FOR MOTOR VEHICLES

FIELD OF THE INVENTION

This invention relates generally to the field of motor vehicle safety signal light systems, and more particularly to a brake light which can complete signaling the braking status of a motor vehicle to observers viewing the vehicle from 360 degrees or from all sides.

BACKGROUND OF THE INVENTION

It is the current practice in the manufacture of motor vehicles to provide brake lights only on the rear of a vehicle. The brake lights provide a visual indication that the brakes have been engaged to vehicles from behind. The lighting on the front of the vehicle is currently limited to headlights, marker lights, and turn signal lights providing an optional indication of where the operator intends to turn. The headlights provide illumination for night driving, the marker lights provide an indication of the outermost edge of the vehicle, and the turn signals provide an indication of where the operator intends to turn.

The problem exists wherein pedestrians, or operators of other vehicles, who are positioned in front of a vehicle do not know if the operator of the vehicle has engaged the brake system. For example, a pedestrian crossing a street would known that the operator of a vehicle being crossed has brakes applied, or not applied, during the crossing. In 2000, the National Highway Traffic Safety Administration reported that 4,739 pedestrians were killed in crashes with motor vehicles and 78,000 were injured. The Federal Highway Administration estimates that the comprehensive cost of each person killed in traffic crashes is $2,900,000 (Year 2000 dollars), wherein multiplying this number by the 4739 pedestrians killed in 2000 totals $13.8 billion dollars. Thus, with such a lighting feature, the pedestrian can use their own judgment before crossing the path of vehicle. The ability for a pedestrian to rely upon facial expression of the vehicle operator is not always practical because of tinted windows, poor lighting conditions, or simply the inattentiveness of operator. While current regulations do not address the need for a forward/side facing brake light, a number of patents have issued in an attempt to meet this need.

U.S. Pat. No. 5,798,691 discloses an accessory brake light system for the front of an automobile consisting of a plurality of LEDs mounted in an elongated housing. By flashing in different pulse sequences, the LEDs can provide various warning signals to indicate braking conditions of the automobile, i.e. whether the vehicle is fully stopped, slowing down, or accelerating.

U.S. Pat. No. 5,373,426 discloses a front-mounted vehicle brake light signal assembly is electrically coupled to both the brake lights of the vehicle and a variable rate flasher. Upon depression of the brake pedal, the signal assembly illuminates or flashes to indicate the vehicle's deceleration.

U.S. Pat. No. 5,255,165 discloses an "after market" brake light assembly adapted to be mounted on the inside surface of the front windshield using suction cups. The brake lights are configured as a series of lights in a column which is electrically coupled with the vehicles conventional brake light system.

U.S. Pat. No. 5,379,198 discloses a "courtesy lamp system" for a vehicle which is installed into a housing located in the back surface of the rear view mirror which includes red and green light sources. The red light sources are coupled to the brake light system of the vehicle and illuminated when the brake pedal is pressed. The green light sources are controlled by a manual switch, and are used by the driver to flash signals to pedestrians or other drivers.

A pedestrian signal system for automobiles is disclosed in U.S. Pat. No. 5,025,245 which incorporates an alternating flasher into the main signal system of the vehicle via a relay to provide communication between a driver and a pedestrian in order to reduce vehicle-pedestrian collisions. The auxiliary system is operated by a momentary pressure on a push button and by the application of pressure to the vehicle brake pedal and will automatically shut off after a predetermined time upon a release of the brake pedal.

U.S. Pat. No. 4,682,146 discloses an indicator light system employing a single horizontally disposed indicator tube operated to provide braking, parking, emergency flasher, and turn indications. The indicator tube is operated at partial intensity for a parking function and full intensity for a braking function. A single electrode on either side thereof may be excited to provide respective left and right hand turn signal indications and the emergency flasher indication is carried out by virtue of causing periodic on and off switching of the indicator tube.

U.S. Pat. No. 4,464,649 discloses an electronic braking alarm indicator for automobiles that will achieve flashing alarming effects in conjunction with braking signals in case of braking actions of the automobile concerned and will further achieve emergency signals for help in case of a crash or other car incident.

Other patents of interest are U.S. Pat. No. 5,272,602, which discloses a device for mounting a supplemental stop lamp to a window pane or the like. U.S. Pat. No. 5,219,218 discloses a stop light for vehicle comprising a ground circuit formed by the vehicles body. Des. Pat. No. 314,244 discloses the ornamental design for an auxiliary vehicle stop light.

U.S. Pat. No. 1,553,959 suggests a manually operated, switch controlled turn and brake signal lamps for the front and rear of a vehicle.

U.S. Pat. No. 1,806,276 describes a manually operated indicator lamp box consisting of three chambers including lamps and moveable reflectors in each chamber, and translucent stencil markings at the front which appears to be meant to be attached inside the windshield.

U.S. Pat. No. 2,190,123 discloses a manually activated indicator lamp box intended to be mounted in a vehicle, approximately in the area of the rear view mirror, to indicate to pedestrians to the front of the vehicle that the driver is yielding the right of way to the pedestrians.

U.S. Pat. No. 3,364,384 discloses a signaling system for depicting a vehicle driver's actions. The proposed system apparently consists of a specially designed light, mounted someplace on the front of the vehicle, connected to sensors within. The light provides different colored visual signals depending upon whether the vehicle is at constant speed, accelerating, or decelerating.

U.S. Pat. No. 3,665,392 discloses a driver communication signal light mounted on the front windshield connected to the vehicle brakes for indicating to pedestrians and other drivers when the driver has applied his brake.

Additional brake lights for automobiles have been mandated as standard equipment by federal regulations, specifically the October 1983 amendment to the Federal Motor Vehicles safety Standard 108, which required Center High Mounted Stop Lamps on all new passenger cars manufactured after Sep. 1, 1985. The purpose of the additional brake light is to reduce the risk of a car or light truck being struck in the rear by another vehicle. The study did not disclose or otherwise address the need for an additional brake light mounted at the front of the vehicle.

The present inventor believes that providing front brake signal lights could similarly serve to reduce accidents and fatalities, particularly with regard to pedestrians. The prior art systems fail to properly position the light to make it viewable by both pedestrians and the operators of other vehicles. The positioning of the light is critical to allow viewing from various angles when approaching a vehicle, completing a 360 degree display of brake status.

U.S. Pat. No. 5,680,101 discloses a brake light similar in placement and configuration to the third rearward facing brake discussed above. However, the placement of the third brake light is intended to prevent rear impact crashes by enabling a following vehicle to react more quickly to the front vehicles's braking. Similar placement of a brake light in the front windshield of a vehicle would not be effective when the moving vehicle is observed from the side by pedestrians or a vehicles at intersecting roads.

No such regulations exist however with regard to "high mounted" auxiliary brake lights mounted on the front of a vehicle. Front facing brake lights have obvious advantages in terms of safety because they indicate to oncoming traffic the nature of driving action being taken, e.g. it would be extremely desirable if the drivers of cars approaching, say, an intersection would know if one or the other were braking. In U.S. Pat. No. 4,837,554 there is disclosed a vehicle signaling system comprising differently colored lights indicating the character of the motion of a vehicle. Thus, when the brake is depressed and the car still is in motion, "red" lights are flashed, whereas when the brake is depressed and the car is stopped "green" lights are flashed. Likewise, U.S. Pat. No. 4,940,962 discloses an auxiliary light system for automobiles where the lights are responsive to depression of the vehicle and the vehicles speed. Here again however, although the lights are front mounted they are located at the bottom of the front bumper rather than being "high mounted."

Thus, there remains a need for a vehicle front brake light system visible from both the front and-sideswhich-has a design and placement suitable for universal implementation in all makes and models of motor vehicles.

SUMMARY OF THE INVENTION

It is an objective of the invention to provide a brake light for motor vehicles which provides a visual indication of braking action from both the front and sides of the vehicle.

It is another objective to provide a brake light for motor vehicles which is not visible to the driver and will not interfere with nighttime visibility.

It is still another objective to provide a brake light for motor vehicles which is esthetically pleasing in design and placement, and which is suitable for installation into any style of motor vehicle and is thus suitable for universal implementation.

It is a further objective of the invention to provide a brake light for motor vehicles which is installed at the time of manufacture.

Yet still another objective of the invention to provide a brake light positioned high upon the vehicle wherein the eyesight of the pedestrian is drawn as well as directing the pedestrian's eyesight to the vehicle operator.

Another objective of the invention is to provide a brake light which can complete signaling the braking status of a motor vehicle to observers viewing the vehicle from 360 degrees or from all sides.

In accordance with the above objectives, a brake light is provided in a for a motor vehicle which is adapted for installation into each of left and right front roof pillars of the vehicle. The brake light is mounted in a recess in proximate the top of each roof pillar and comprises a housing including a reflective shell and a translucent lens member matingly attached thereto to form a sealed enclosure; a socket disposed in said housing and secured to said reflective shell having a light bulb removably inserted therein; and a means to electrically couple the socket to the brake light electrical system whereby said light bulb is illuminated continuously and simultaneously when the vehicle brakes are applied. The translucent lens member can be configured to be flushly aligned with the top surface of the roof pillar. In an alternative embodiment, the brake light can be illuminated by fiber optic cables.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE INVENTION

Although the invention will be described in terms of a specific embodiment, it will be readily apparent to those skilled in this art that various modifications, rearrangements, and substitutions can be made without departing from the spirit of the invention. The scope of the invention is defined by the claims appended hereto.

Figure 1:
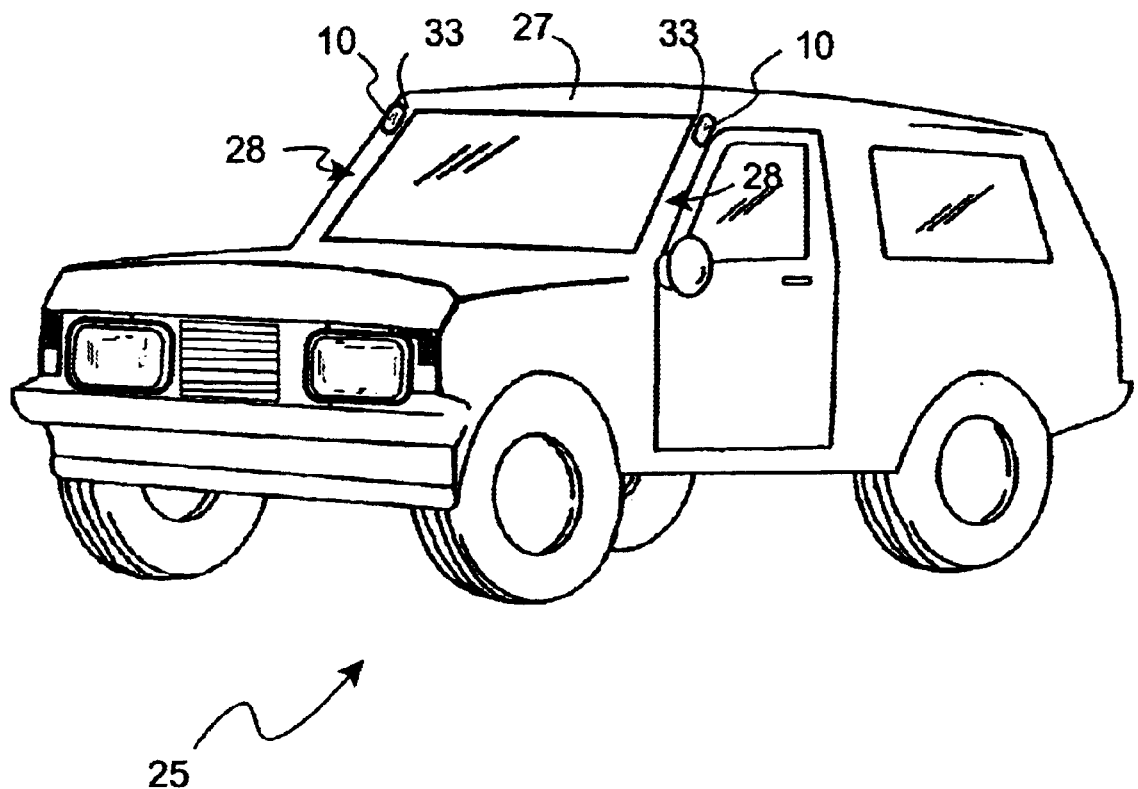
FIG. 1 is a perspective view of the front portion of an automobile having brake lights installed in the front roof pillars in accordance with a preferred embodiment of the invention.

FIG. 1 illustrates a front view of a typical automotive vehicle 25 having a body 26 which includes a roof 27. The roof 27 is supported by a plurality of upwardly extending roof pillars which are contiguous with the roof 27. In the illustrated view, it is seen that the vehicle 25 includes left and right front roof pillars 28 having upper ends 33 at a point of intersection with the roof 27.

In accordance with the principles of the invention, the left and right roof pillars 28 respectively include brake lights 10 which are mounted within the pillar and are placed proximate the upper ends 33 of the roof pillars 28. The front brake lights 10 are electrically coupled to the vehicle brake system, and function in a manner identical to the rear brake lights in that they indicate the braking status of the vehicle as a function of pressure on the vehicle brake pedal. The unique placement of the brake lights 10 on the roof pillars 28 is a key aspect of the invention as it allows the brake lights to be visible from the front of the vehicle as well as the left and right sides. The brake lights 10 are positioned at the upper end of the roof pillars 28 for maximum visibility. Further, the placement of the brake lights 10 ensures that the emitted light will not be seen by the occupants of the vehicle so that the light does not interfere with the driver's nighttime visibility.

Figure 2:
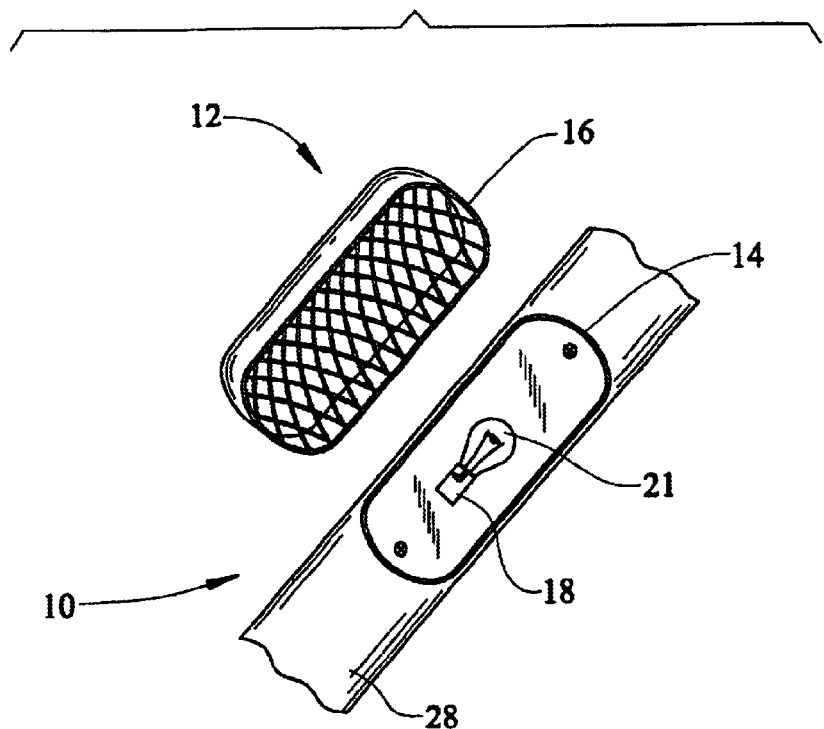
FIG. 2 is an exploded view of the brake light of FIG. 1.
Figure 3:
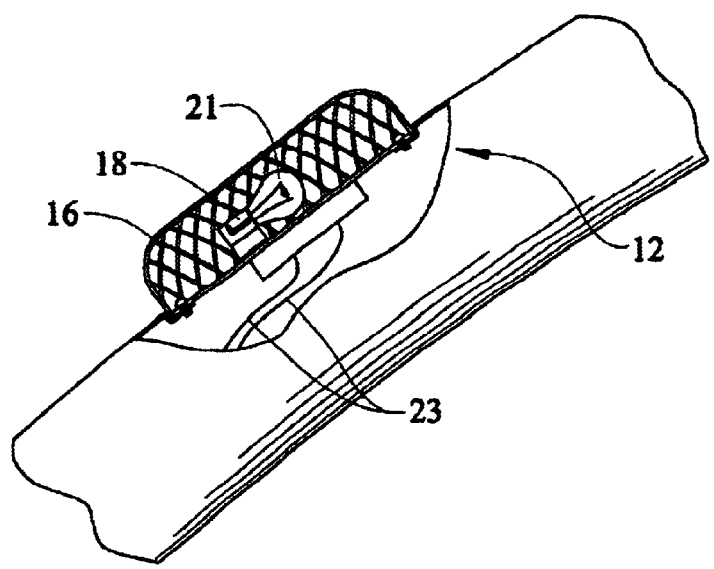
FIG. 3 is a partial cross-sectional view of the installation of the brake lights of FIG. 1.

As seen in FIGS. 2 and 3, the brake light 10 includes a housing 12 inset into the front pillar 28. The housing 12 includes a reflective shell 14 which is matingly attached to a translucent lens 16 to form a sealed enclosure. A socket 18 is disposed within the housing 12 and secured to the reflective shell 14. A light bulb 21 is removably inserted into the socket 18. The socket 18 is coupled to the vehicle brake light system by wires 23 so that the light bulb 21 glows continuously when the vehicle brakes are applied. In an alternative embodiment, the light bulb 21 can flash.

Figure 4:
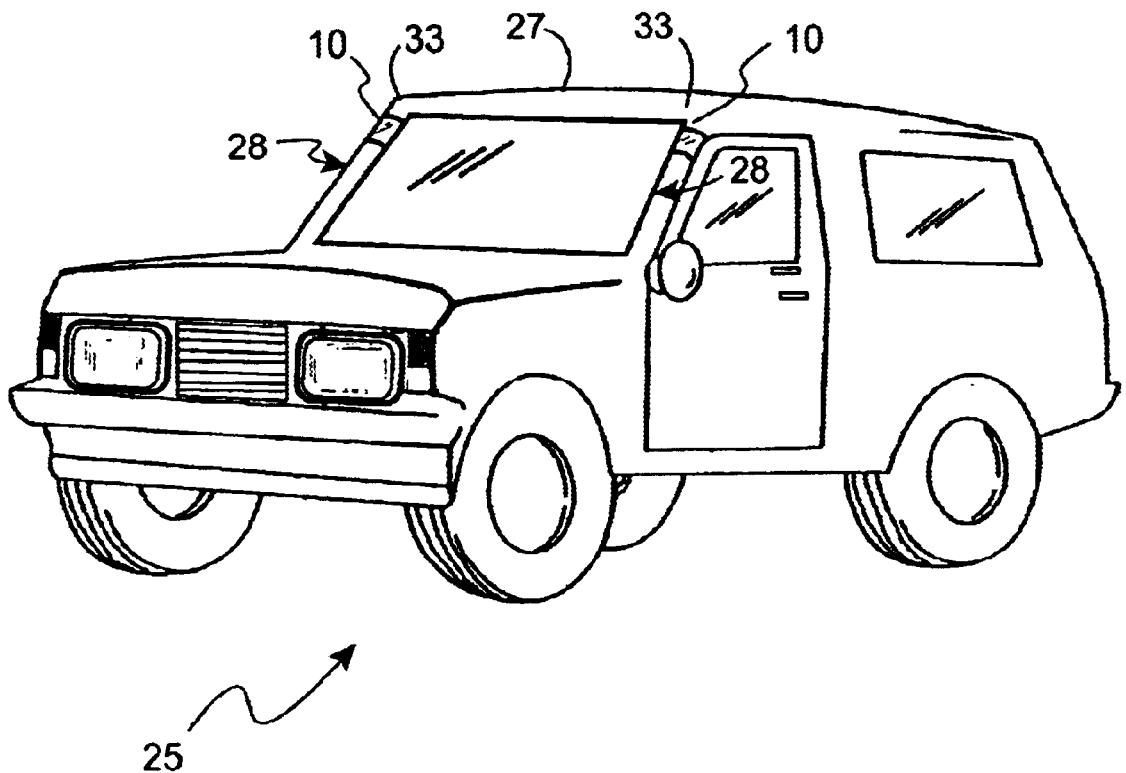
FIG. 4 illustrates an alternative configuration of the translucent lens member.

The brake light housing 12 can have any suitable configuration as would be esthetically desired for a particular model of motor vehicle. In the embodiment illustrated in FIG. 4, the translucent lens member 16 is configured to be flushly aligned with the top surface 31 of the front pillar 28.

The translucent lens member 16 can be of any desired hue, such as amber, green, aqua, magenta, etc. Red, however, is generally not permitted, as it would cause confusion with rear brake lights. A clear lens member 16 is also undesirable as it may be indistinguishable from headlights or fog lights at night and therefore confusing. In practice, it is preferable that the color of the translucent lens member 16 be standardized for all vehicles so that the braking action indicated by the illumination of the lights is universally recognizable by observers the world over.

Figure 5:
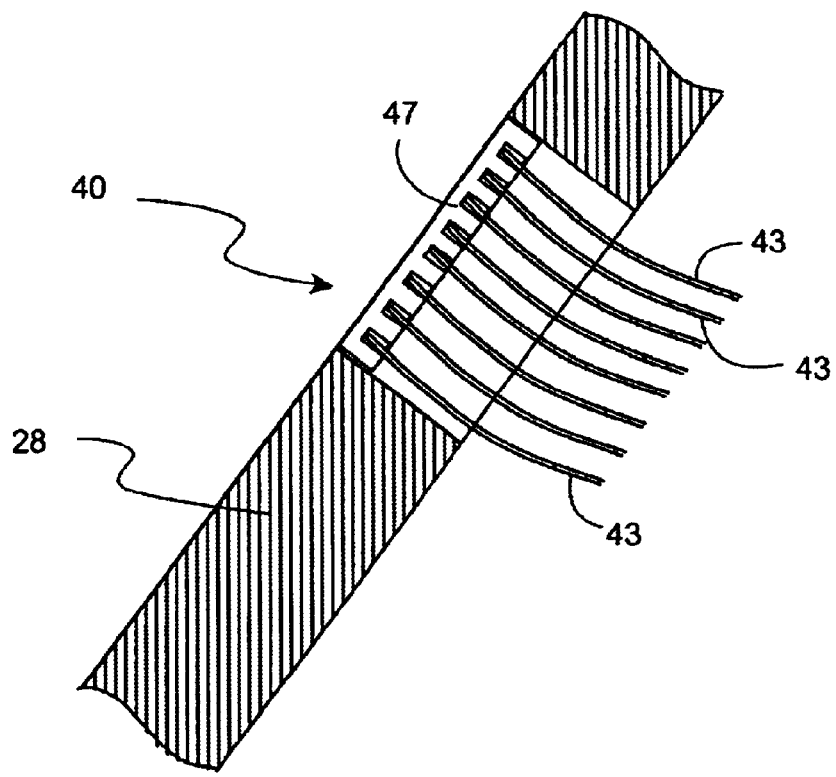
FIG. 5 is a cross-sectional view of a first alternative embodiment of the invention utilizing fiber optic cables.
Figure 6:
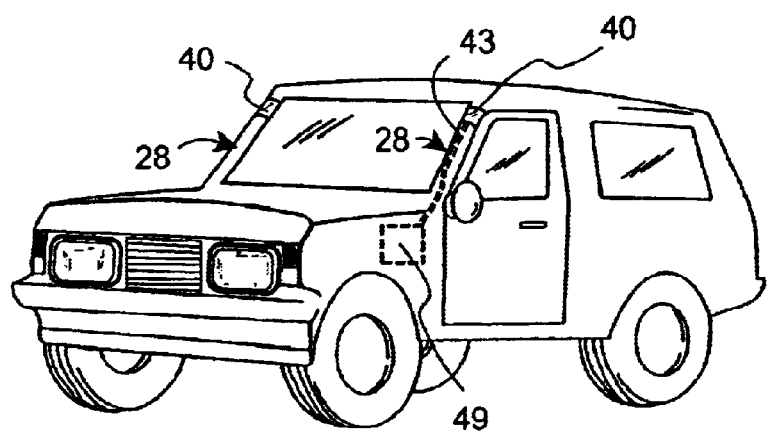
FIG. 6 illustrates the installation of the embodiment shown in FIG. 5 on a motor vehicle.

The brake light 10 can also be illuminated using alternative light sources such as LEDs or fiber optic cables. FIGS. 5 and 6 illustrates an alternative embodiment in which a front brake light 40 which includes a plurality of fiber optic cables 43. The inside surface of translucent lens 47 is inset with a plurality of cylindrical recesses 51 which receive the terminal light-emitting ends 44 of the fiber optic cables 43. The terminal light-emitting ends 44 serve to illuminate the translucent lens 47. The input ends 45 of the fiber optic cables 43 are coupled to a halogen lamp light source 49. The halogen light source 49 is electrically coupled to the vehicle brake circuit so that the brake lights 40 are illuminated when the vehicle brake pedal is applied. The halogen lamp light source 49 can be contained in the engine compartment, as shown in FIG. 6. The translucent lens 47 is preferably configured to be in flush alignment with the top surface 31 of the roof pillar 28 to present an uninterrupted surface. The light source 49 can either cause the brake lights 40 to glow continuously when the brakes are applied, or the brake lights 40 can flash. The light source 49 can also be programmable so that the fiber optic cables 43 display an animated pattern by selectively variably illuminating said fiber optic cables.

Figure 7:
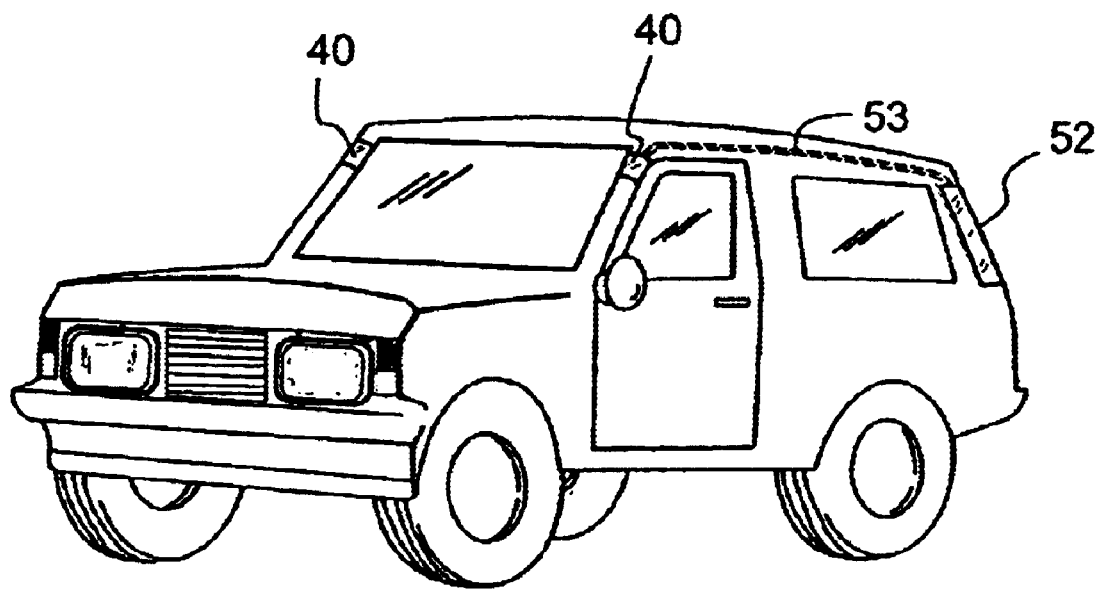
FIG. 7 illustrates a second alternative embodiment of the invention utilizing fiber optic cables.

Alternatively, as shown in FIG. 7, the lamp source can be contained in the rear brake housing 52 wherein a fiber optic cable 53 is coupled to the brake lights 40. The fiber optic bundle input can be placed in such a position so that the light source is an existing incandescent stop lamp.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

I claim:

1. In a motor vehicle having a brake light electrical system, wherein the motor vehicle has a body which includes a roof panel having left and right front pillars extending therefrom wherein the left and right front pillars each have a top surface, a brake light mounted in a recess in each of said pillars to provide a visual indication of brake pedal activation from 360 degrees when viewed in combination with the existing rear brake light, said pillar mounted brake lights comprising:

a housing including a reflective shell and a translucent lens member matingly attached thereto to form a sealed enclosure;

a socket disposed in said housing and secured to said reflective shell, said socket having a light bulb removably inserted therein; and means to electrically couple said socket to said brake light electrical system whereby said light bulb is illuminated continuously when the vehicle brakes are applied.

2. The brake light of claim 1, wherein said translucent lens member is configured to be flushly aligned with said top surface.

3. The brake light of claim 1, wherein said translucent lens has an amber hue.

4. The brake light of claim 1, wherein said translucent lens has a green hue.

5. The brake light of claim 1, wherein said translucent lens has an aqua hue.

6. The brake light of claim 1, wherein said translucent lens has a magenta hue.

7. The brake light of claim 1, wherein said translucent lens is red and said light bulb is flashing.

8. The brake light of claim 1, wherein said light source is a halogen lamp.

9. The brake light of claim 1, wherein said light source is an incandescent lamp.

10. In a motor vehicle having a brake light electrical system, wherein the motor vehicle has an engine compartment and a body which includes a roof panel having left and right front pillars extending therefrom wherein the left and right front pillars each have a top surface, a brake light mounted in a recess in each of said pillars to provide a visual indication of brake pedal activation from 360 degrees when viewed in combination with the existing rear brake light, said pillar mounted brake lights comprising:

a lamp light source;

a plurality of fiber optic cables, said fiber optic cables having an initial end coupled to said lamp light source and a terminal light-emitting end;

a translucent lens member covering said recess wherein said translucent lens is flushly aligned with the top surface of said roof pillar, said translucent lens member having an outer surface and an inner surface wherein said inner surface includes a plurality of cylindrical recesses adapted to receive said terminal light-emitting ends of said plurality of fiber optic fibers; and means to electrically couple said light source to the vehicle brake light electrical system whereby said light is continuously emitted through said fiber optic cables when the vehicle brakes are applied.

11. The brake light of claim 10, wherein said halogen lamp light source is mounted in the vehicle engine compartment.

12. The brake light of claim 10, wherein said translucent lens has an amber hue.

13. The brake light of claim 10, wherein said translucent lens has a green hue.

14. The brake light of claim 10, wherein said translucent lens has an aqua hue.

15. The brake light of claim 10, wherein said translucent lens has a magenta hue.

16. The brake light of claim 10, wherein said translucent lens is red and said light source is flashing.

17. The brake light of claim 10, wherein said light source is a halogen lamp.

18. The brake light of claim 10, wherein said light source is an incandescent lamp.

19. The brake light of claim 10, wherein said light source is programmable to selectively variably illuminate said fiber optic cables.

* * * * *